Jan. 26, 1965 C. H. SCHMIDGALL 3,166,802
JOINT CONSTRUCTION AND SEAL THEREFOR
Filed June 27, 1962 2 Sheets-Sheet 1
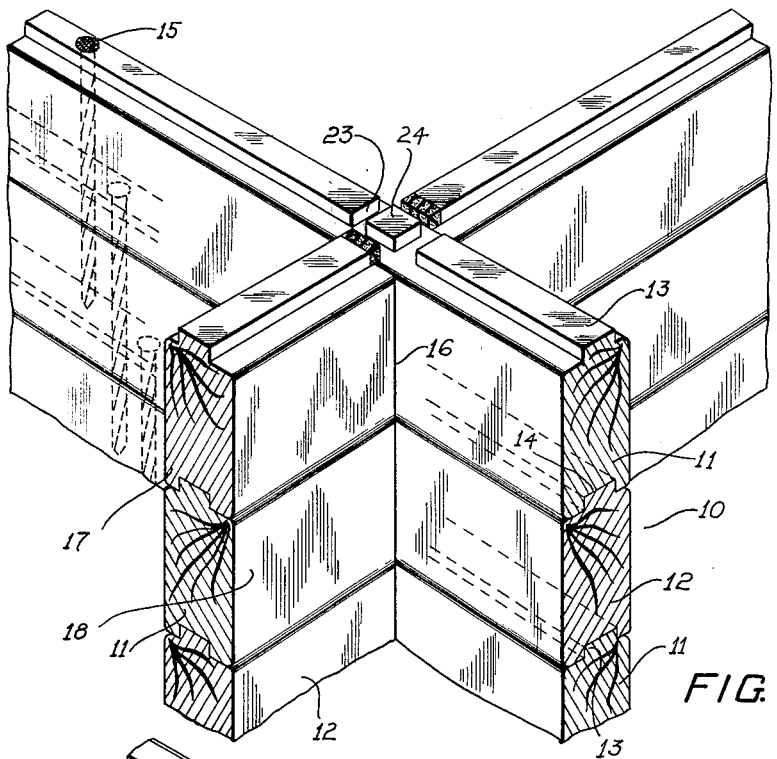
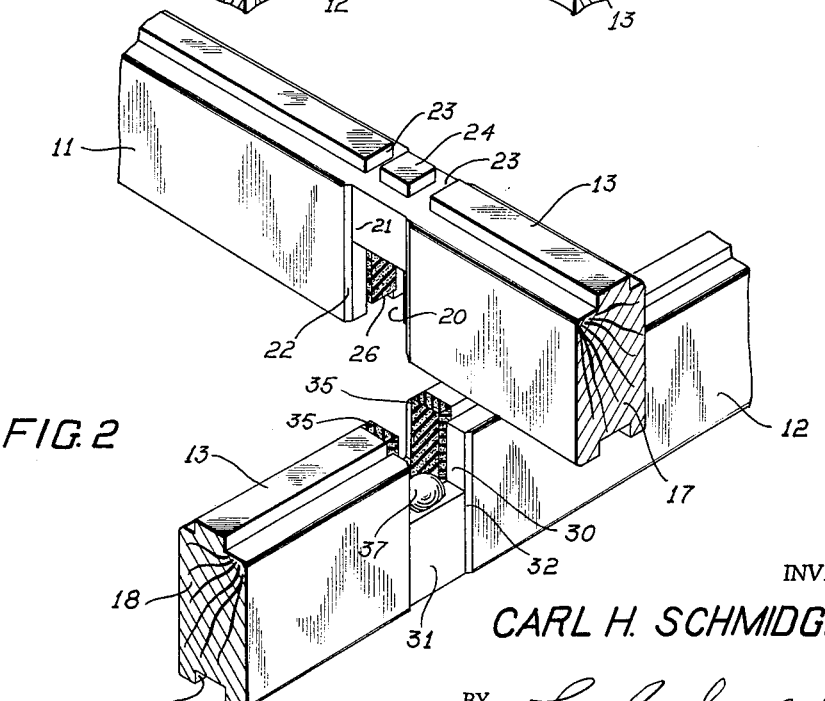
INVENTOR
CARL H. SCHMIDGALL
BY L. S. Saulsbury
ATTORNEY Jan. 26, 1965   C. H. SCHMIDGALL   3,166,802
JOINT CONSTRUCTION AND SEAL THEREFOR
Filed June 27, 1962   2 Sheets-Sheet 2

INVENTOR
CARL H. SCHMIDGALL
BY L. S. Saulsbury
ATTORNEY

3,166,802
JOINT CONSTRUCTION AND SEAL THEREFOR
Carl H. Schmidgall, % Schmidgall Mfg. Co., Inc.,
307 Cass St., Peoria, Ill.
Filed June 27, 1962, Ser. No. 205,598
2 Claims. (Cl. 20—92)

This invention relates to a joint construction and seal therefor and has particular applicability to the notched joints of interlocking log cabin type cross members at the joints at corner sections.

A primary object of the invention is the provision of an improved joint construction involving a spherical member of pliable plastic which is compressible upon the interengagement of two notched crossed beams or timbers to expand the same and automatically seal the edges and side slots, providing a plastic seal.

An additional object of the invention is the provision of a device of this character wherein asphalt impregnated plastic seal strips are provided along the side edges of the joint to provide a substantially fluid and air tight seal when the parts are in assembled relation.

A still further object of the invention is the provision of a joint and seal of this character which is relatively simple and inexpensive to assemble and utilize, and which when assembled will afford an exceptionally tight construction precluding the entry of moisture or air at the intersection of such crossed timbers.

Still other objects reside in the combinations of elements, arrangements of parts, and features of construction, all as will be more fully pointed out hereinafter and shown in the accompanying drawings wherein there is disclosed a preferred embodiment of this inventive concept.

In the drawings:

FIG. 1 is a perspective view of a fragment of corner joint construction embodying the instant inventive concept.

FIG. 2 is an exploded perspective view showing adjacent notched interlocking members, and illustrating the joint and seal of the instant invention.

Similar reference characters refer to similar parts throughout the several views of the drawings.

Having reference now to the drawings in detail there is generally indicated at 10 a jointed structure of the so-called log cabin type comprised of superposed notched rectangular timbers 11 and 12, the ends of which, which extend beyond the joint structure being smooth. Each of the timbers 11 and 12 is provided on its top with a tongue 13 and on its lower side with a groove 14, alternate tongues and grooves interlocking vertically to form a strong vertically interlocked wall construction. The timbers are fastened in any desired manner, as for example with the conventional twisted spikes indicated in dotted lines at 15 in FIG. 1. The long edges of the timbers 11 and 12 are provided alternately with tongues and grooves, for the purpose of forming interlocking joints.

Figure 3:
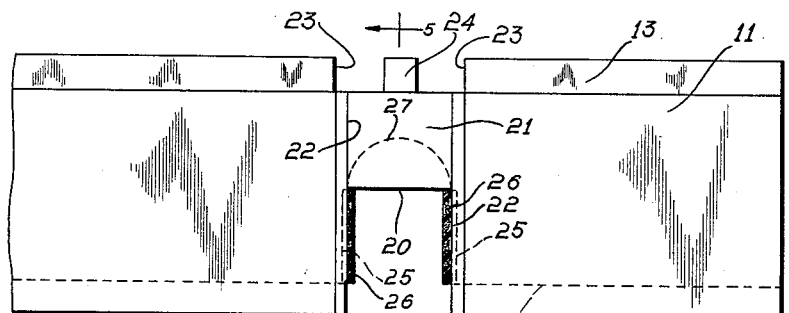
FIG. 3 is a plan view of one of the members comprising the joint and its seal.
Figure 4:
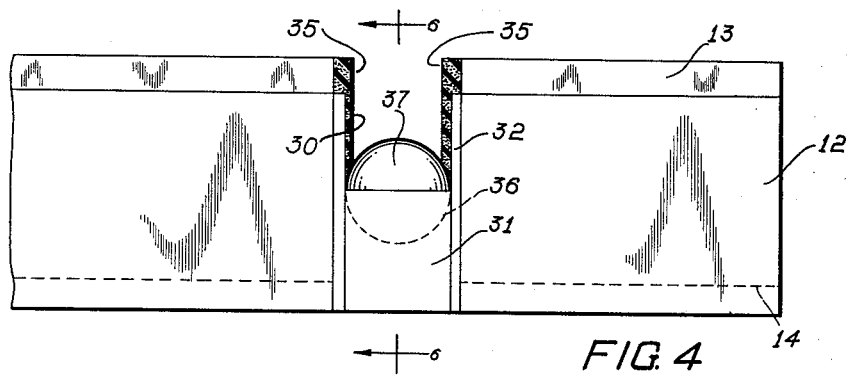
FIG. 4 is a plan view of the other of the interlocking members.
Figure 5:
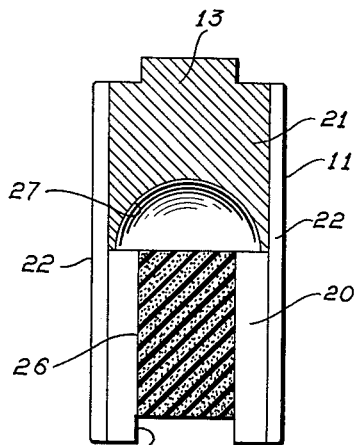
FIG. 5 is an enlarged sectional view taken substantially along the line 5—5 of FIG. 3.
Figure 6:
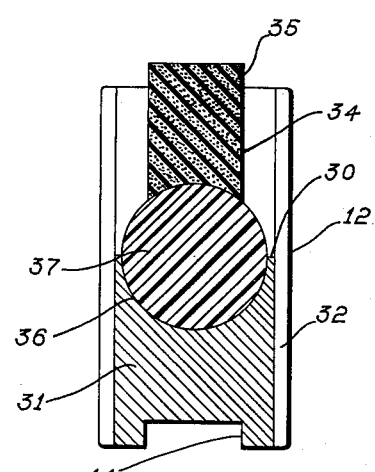
FIG. 6 is an enlarged sectional view taken substantially along the line 6—6 of FIG. 4.

The instant invention is concerned primarily with the interengagement of timbers 12 at the junction indicated by the line 16, whereat right angularly disposed timbers are interlocked and sealed, leaving projecting end portions 17 and 18 of alternate timbers 11 and 12, the inner portion of the timbers comprising the walls of the structure. Referring first to the timbers 11 it will be seen that the timber includes a lower notch 20 extending approximately one-half the width of the timber, the connecting portion 21 extending above the notch 20 being reduced in thickness, as best shown in FIG. 5, and bevels 22 extending along the sides of both the notch and the connecting portion. The upper tongue 13 is cut away as at 23, 23 providing a central rectangular boss 24, so that the edges of the corresponding grooved timber 12 extending transversely of the timber 11 may seat over the central rectangular boss 24 formed by the cut away portions 23, 23. The sides of the notch 20 are vertically grooved as indicated in dotted lines at 25 in FIG. 3, and these grooves contain elongated strips 26 of asphalt impregnated plastic.

The lower portion of the upper connecting portion 21 is provided with a hemispherical socket 27.

The opposite timbers 12 are provided with upper notched portions 30 extending substantially half the width thereof, the remainder of the body of each timber being closed by a transverse portion 31 of reduced thickness, corresponding to that of the portion 21. The edges of the notch and portion 31 are beveled as at 32.

Central grooves 34 are cut in the opposite sides of the notch 30, and contain asphalt dipped or impregnated plastic strips 35 disposed at right angles to the previously described strips 26, and also serving a sealing function.

The top of transverse portion 31 contains a hemispherical recessed socket portion 36 dimensioned to conform to that of the socket portion 27 so that when the timbers 11 and 12 are superposed a substantially spherical socket is formed at the juncture of cross portions 21 and 31. The lower socket 36 contains a compressible plastic spherical member or ball 37, the over-all diameter of which slightly exceeds that of the spherical socket formed by the juxtaposition of socket portions 27 and 36, so that when adjacent timbers 11 and 12 are superposed into sealing relation, the ball 37 is compressed and deformed, expanding outwardly effectively to seal the joints between the juxtaposed edges of notches 20 and 30 to provide a very effective substantially fluid-tight seal at the juncture of the interlocked timbers.

Timbers 11 and 12 are superposed alternately and oppositely in the interconnected wall structures, so that by virtue of the provision of an interlock and seal between each adjacent and opposite pair of timbers 11 and 12 a substantially fluid-tight and air tight vertical seal extends substantially the full height of the joint 16.

From the foregoing it will now be seen that there is herein provided an improved interlocking joint structure and seal therefor which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. An intersecting wall corner joint construction comprising a plurality of superimposed elongated rectangular shaped timbers, each of said timbers having a notch disposed transversely thereof and extending from one longitudinal edge of the timber inwardly toward the other longitudinal edge thereof for approximately one-half the width of the timber, the solid portion of the other one-half of the width of the timber opposite the notch having a semi-spherical socket portion communicating with the inner end of said notch, the depth of the notch being such that when adjacent timbers are assembled at a right angle to each other with said notches coinciding, the socket portions will coincide to form a complete socket opening common to both of the adjacent timbers, and a compressible plastic ball fitted in the complete socket opening for sealing the joints between the adjacent timbers, the diameter of the ball being greater than the diameter of the complete spherical socket.

2. An intersecting wall corner joint construction comprising a plurality of superimposed elongated rectangular shaped timbers, each of said timbers having a notch disposed transversely thereof and extending from one longitudinal edge thereof for approximately one-half the width of the timber, the solid portion of the other one-half of the width of the timber opposite the notch having a semi-spherical socket portion communicating with the inner end of said notch, the depth of the notch being such that when adjacent timbers are assembled at a right angle to each other with said notches coinciding, the socket portions will coincide to form a complete socket opening common to both of the adjacent timbers, and a compressible plastic ball fitted in the complete socket opening for sealing the joints between the adjacent timbers, the diameter of the ball being greater than the diameter of the complete spherical socket, said timbers having grooves in the side edge walls of the notches, said side edge walls of the notches being beveled, said side edge walls of the notches having grooves, and strips of asphalt impregnated plastic in the grooves.

References Cited by the Examiner

UNITED STATES PATENTS

| | | | |
|---|---|---|---|
| 1,314,531 | 9/19 | Monroe. | |
| 2,122,869 | 7/38 | Morris | 50—203 |
| 2,140,672 | 12/38 | Gray. | |
| 2,490,586 | 12/49 | Embree | 20—92 |
| 2,712,678 | 7/55 | Jensen | 20—4 |
| 2,923,386 | 2/60 | Harry | 50—201 |
| 2,930,222 | 3/60 | Bender. | |

FOREIGN PATENTS 677,042   8/52   Great Britain.

JACOB L. NACKENOFF, *Primary Examiner.*